United States Patent [19]

Miller-Jones et al.

[11] Patent Number: 4,534,359
[45] Date of Patent: Aug. 13, 1985

[54] METHOD AND MEANS FOR DETERMINING FREQUENCY SELECTIVE TISSUE ATTENUATION IN A BASEBAND ULTRASONIC IMAGING SYSTEM

[75] Inventors: Stockton M. Miller-Jones, Cameron Park, Calif.; Stephen W. Flax, Waukesha, Wis.

[73] Assignee: General Electric Company, Milwaukee, Wis.

[21] Appl. No.: 446,347

[22] Filed: Dec. 2, 1982

[51] Int. Cl.³ .............................................. A61B 10/00
[52] U.S. Cl. ...................................... 128/660; 73/599; 73/626
[58] Field of Search ................................ 128/660–663; 73/599, 626; 324/83 A, 85

[56] References Cited

U.S. PATENT DOCUMENTS

| | | | |
|---|---|---|---|
| 3,068,407 | 12/1962 | Altman | 324/83 A |
| 3,076,963 | 2/1963 | Byatt | 324/83 A |
| 3,078,415 | 2/1963 | Frelich | 324/85 |
| 3,509,475 | 4/1970 | Webb | 324/83 A |
| 3,900,879 | 8/1975 | LeWinter | 324/85 |

Primary Examiner—Kyle L. Howell
Assistant Examiner—Ruth S. Smith
Attorney, Agent, or Firm—Flehr, Hohbach, Test, Albritton & Herbert

[57] ABSTRACT

Ultrasonic wave attenuation in passing through tissue is determined from frequency changes in reflected ultrasonic waves passing through the tissue. In a baseband ultrasonic imaging system in which transducer generated signals are coherently detected by mixing the signals with a fixed frequency signal both in phase and in phase quadrature, a measure of frequency change in the reflected ultrasonic signal is obtained by measuring phase shift in a side band of the mixed signals.

2 Claims, 2 Drawing Figures

FIG.—1
PRIOR ART

METHOD AND MEANS FOR DETERMINING FREQUENCY SELECTIVE TISSUE ATTENUATION IN A BASEBAND ULTRASONIC IMAGING SYSTEM

This invention relates generally to ultrasonic scanning systems, and more particularly the invention relates to a method and means for determining tissue attenuation by detecting phase shift in a demodulated echo signal in a baseband ultrasonic scanning system.

Ultrasonic scanning systems are known and commercially available for medical diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Technique Select". The commercially available Datason ultrasonic system of General Electric Company provides an A trace display along with both real time and static images on a television display.

Briefly, such systems utilize sound transducers to transmit ultrasonic (e.g. on the order of several megahertz) waves into a patient and to receive echo signals. In one mode of operation, the transducer is attached to a plurality of hinged arms for movement in a single plane, and potentiometers associated with the hinged arms produce signals which identify the transducer in position. Alternatively, a hand held transducer or a linear transducer array can be employed. Conventionally, the echo signals are applied to a variable gain amplifier to adjust the echo signals for attenuation when passing through the patient. The adjusted signals are then passed through an analog to digital conversion and video processing circuitry and thence either to standard converter circuitry for controlling the body scan display or to A trace conversion circuitry for graphically depicting the ultrasonic pulse echo. The echo amplitude is typically graphically represented as the ordinate value, while the echo return time (indicative of body depth) is reproduced on the abscissa. Accordingly, by viewing the A trace one may determine the depth into the body of each discontinuity in the pulse propagation path and the type of media transition.

It is known that tissue attenuation of an ultrasonic wave affects not only the magnitude but also the frequency of the reflected wave. Copending application Ser. No. 369,423 filed Apr. 19, 1982, for "Method and Means For Determining Ultrasonic Wave Attenuation in Tissue" discloses a method of determining tissue attenuation from changes in frequency. Copending application Ser. No. 369,370 filed Apr. 19, 1982 for "Method and Means For Generating Timegain Compensation Control Signal For Use in Ultrasonic Scanner and the Like" correlates signal amplitude to signal frequency and establishes a gain control signal based on the frequency (or zero crossings) of the reflected signal.

However, not all ultrasound systems retain the transducer generated electrical signals in suitable form for detecting frequency shift of the signals. For example, in a baseband system the signals generated by a transducer array are mixed with in-phase and quadrature phase demodulating signals. The demodulated signals from the mixer are suitably delayed for coherent summation, and the summed in phase and quadrature phase demodulated signals then provide a resultant signal from which a high resolution image of objects in a focal zone of the transducer array is obtained. The General Electric baseband ultrasonic system is disclosed in detail in U.S. Pat. No. 4,154,113 for "Ultrasonic Imaging System".

The present invention is directed to a method and means for determining ultrasonic wave attenuation in tissue under examination and predicting center frequency shift due to attenuation in a baseband ultrasonic imaging system.

Accordingly, an object of the present invention is a method of determining ultrasound attenuation coefficients in a baseband ultrasonic imaging system.

Another object of the invention is an apparatus for use in a baseband ultrasonic imaging system for detecting frequency shift associated with frequency selective attenuation.

Briefly, the demodulated signals in a baseband ultrasonic imaging system include single sideband signals at the sum and at the difference of the frequencies of the two mixed signals. By filtering out either sideband and detecting the frequency thereof, phase shift due to changes in the transducer generated signals can be readily determined. The phase shift can be correlated to the frequency shift in the reflected ultrasound signal from which tissue attenuation can be determined as described in the copending applications, supra.

The invention and objects and features thereof will be more readily apparent from the following detailed description and appended claims when taken with the drawing, in which:

Figure 1:
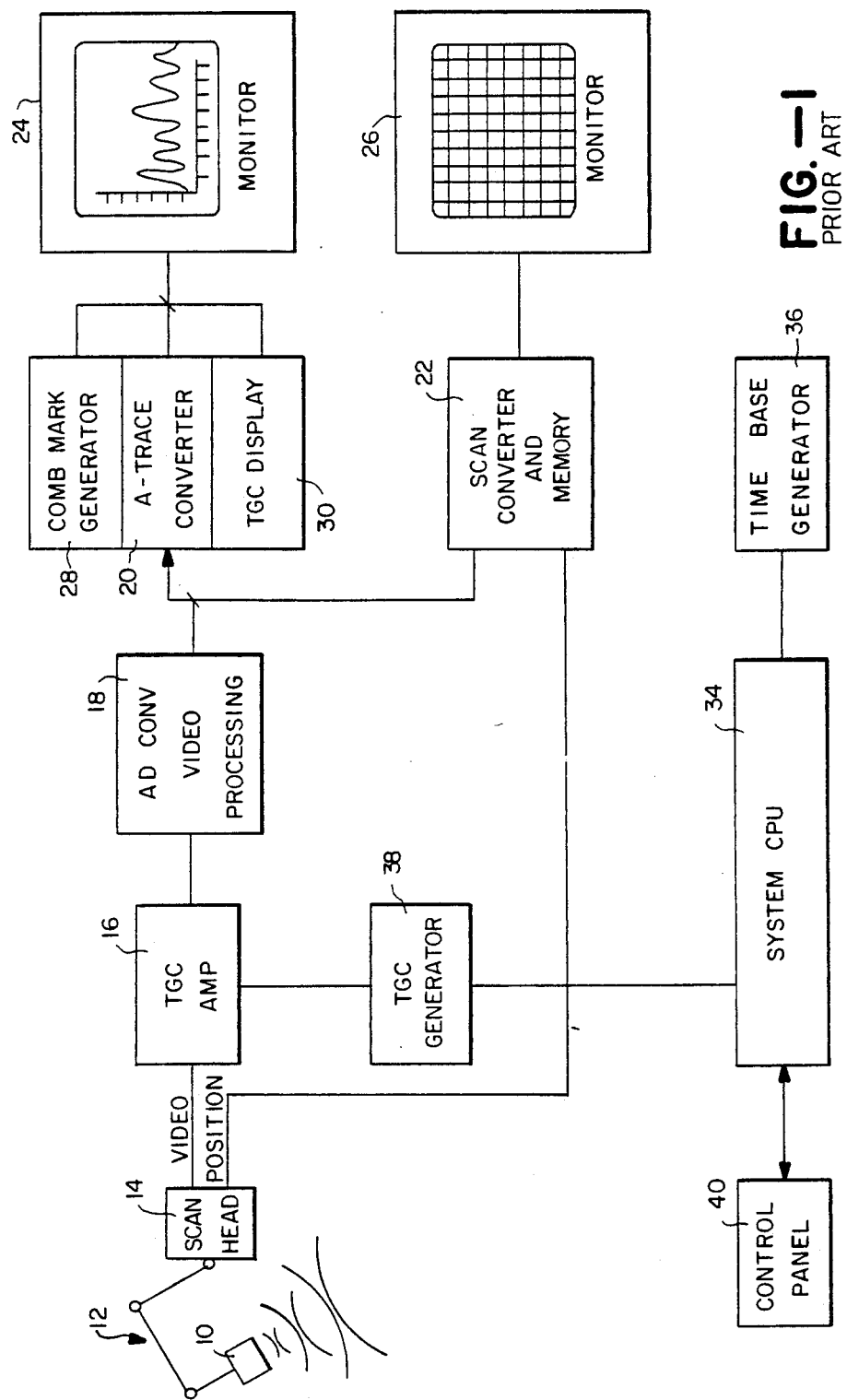
FIG. 1 is a functional block diagram of a conventional ultrasonic scanning system.

Referring now to the drawings, FIG. 1 is a functional block diagram of an ultrasonic scanner. In this embodiment the systems includes a transducer 10 mounted on a hinged arm system shown generally at 12 whereby transducer 10 can move freely in a single plane. Alternately, a hand held transducer array can be used. Potentiometers in scanhead 14 and associated with the arms of the system generate signals indicative of the X and Y position of the scanner 10 in the plane of motion.

Transducer 10 transmits ultrasonic signals (e.g. on the order of 2 megahertz) and generates electrical signals in response to reflections of the transmitted ultrasonic signals. The generated signals are attenuated in time due to attenuation of the ultrasonic signal in passing through a patient.

The attenuated video signal is then applied to a variable gain amplifier 16, and the amplified signal is then applied to analog to digital conversion and video processing circuitry 18. The output of circuitry 18 is then applied to A trace converter circuitry 20 and to scan converter and memory circuitry 22 which generate the signals for controlling television monitors 24 and 26, respectively.

The A trace converter generates a signal for real time display of the amplitude of each reflected ultrasonic wave. The A trace data applied to monitor 24 identifies a horizontal position on the monitor (e.g. 1,000 positions) and an amplitude or vertical position associated with each horizontal position. This data controls the intensity of the electron beam in the display during raster line scanning by the beam. Scale markings for the displayed A trace are generated by comb mark generator 28, and a time gain compensation curve is provided by generator 30.

A section view of the patient is displayed on monitor 26 in response to the scan converter and memory 22. The signal from circuitry 18 is converted for storage in a 512×512 memory matrix with each point in the matrix accommodating a 5 bit brightness code. The matrix corresponds to the pixels on the display of monitor 26 with the brightness code being indicative of the Grayscale for the pixels.

System control is provided by a central processing unit 34 which also controls a time base generator 36 which generates the timing signals for the system. A time gain compensation (TGC) control generator 38 generates the control signal for amplifier 16 and a control panel 40 is provided for manual control of the system through the central processing unit.

As briefly described hereinabove, copending application Ser. No. 369,423 discloses a method of determining ultrasonic wave attenuation in tissue by measuring the zero crossings (e.g. the frequency) of reflected ultrasonic waves. The average zero crossing density from a reflected ultrasound signal characterizes the second moment of the frequency spectrum which in turn determines the frequency dependent attenuation coefficient of the tissue.

However, as further described above, a baseband ultrasonic imaging system does not retain the transducer generated signal but rather demodulates the signal to obtain an intermediate frequency which is then processed for signal analysis.

Figure 2:
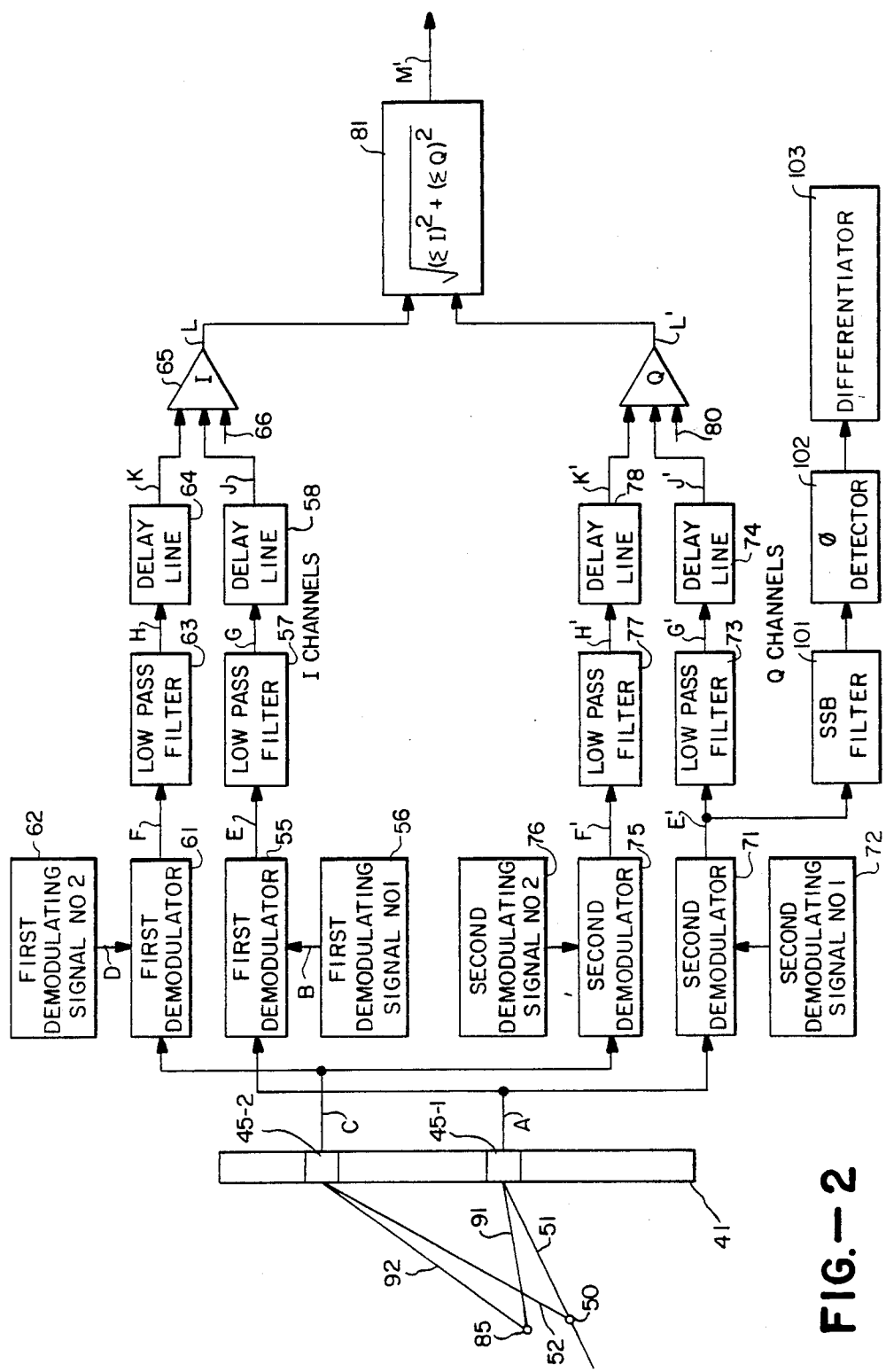
FIG. 2 is a functional block diagram of a baseband ultrasound scanning sub-system as modified to detect and determine frequency selective attenuation in accordance with one embodiment of the invention.

FIG. 2 is a functional block diagram of a baseband subsystem as employed in the system of FIG. 1, as described in detail in U.S. Pat. No. 4,154,113. The apparatus includes an array 41 of transducers 45 having substantially the same resonant frequency. For simplicity of explanation, array 41 is shown as a linear array, but might have any other suitable shape. Point 50 represents an object point in an object region surrounding the array. A burst of several cycles of ultrasound produced by the array impinges upon the object point 50 and generates an echo. The burst produced by a plurality of transducers of the array may be considered to originate at the center of the array. The echo is received at various transducers of the array at different times depending upon the distances between the object point 50 and the transducers of the array. Such an echo produces a set of echo signals in the transducers elements—one in each transducer. The processing of echo signals generated in transducers 45-1 and 45-2 will be particularly described.

It will be understood that the echo signals generated in the other transducers are similarly processed. Transducer 45-1 is located at the center of the array and transducer 45-2 is located above the center of the array. Line 51 represents the propagation path of the echo reflected from object point 50 to the center of transducer 45-1. Line 52 represents the propagation path of the echo reflected from object point 50 to transducer 45-2.

The echo signal generated in the transducer 45-1 is referred to as echo signal No. 1 and the echo signal generated in transducer 45-2 is referred to as echo signal No. 2. Each of echo signals No. 1 and 2 as well as the echo signals generated in each of the other transducers of the array are processed in a respective signal processing channel, referred to as an I channel. Each of the I channels performs the functions of demodulation, filtering, and delay. Each of echo signals No. 1 and 2 as well as the other echo signals generated in the other transducers of the array are also processed in a respective Q signal processing channel in which the functions of demodulation, filtering, and delay are also provided.

The demodulating signal utilized in each of the Q channels is set to be in phase quadrature relationship with respect to the demodulating signal utilized in the demodulation process in a respective I channel. The delayed signals in the I and Q channels are coherently summed to obtain a first sum signal and a second sum signal, respectively. From the first sum signal and the second sum signal a resultant signal is developed representing the reflection from the object point 50.

The signal generated by each of the elements of transducer array 41 when mixed with the demodulating signals in each of the demodulators are lost for future signal processing. However, each of the demodulators produces sideband signals at the sum and difference, respectively, of the array generated signals and the demodulator signals. Accordingly, changes in frequency of the array generated signals are manifested as phase slippage in the single sidebands produced by the demodulators. In accordance with one embodiment of the present invention a single sideband filter 101 is connected to the output of one or more of the demodulators such as the second demodulator 71 whereby a single sideband signal is obtained. So long as the frequencies of the demodulation signal and the array generated signal remain constant, the single sideband signal will also remain constant. However, a decrease in frequency in the array generated signal due to tissue attenuation produces a detectable phase slippage in the signal from filter 101. Thus, the phase detector 102 can detect the slippage by differentiating the phase shift over a period of time in differentiator 103, and a measure of the change in zero crossings (or frequency) of the echo signals is thus obtained. Thereafter, the method disclosed by Flax in copending application Ser. No. 369,423, supra, can be employed to determine ultrasound attenuation coefficients.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In a baseband medical ultrasonic imaging system in which transducer means receives reflected ultrasonic waves and generates input electrical signals and demodulator means mixes said input electrical signals with a demodulator signal to obtain a high resolution focused image signal, a method of determining frequency shift of said input electrical signals over a period of time comprising the steps of filtering the output signals of said demodulator means to obtain a sideband signal of said mixed input signals and demodulator signal, detecting phase change of said sideband signal, and differentiating said detected phase change over said period of time.

2. In a medical ultrasonic imaging system, a method of determining frequency change in a reflected ultrasonic signal as a measure of tissue attenuation and gain control comprising the steps of generating an electrical signal in response to said reflected ultrasonic signal, mixing said electrical signal with a fixed frequency signal to obtain a beat signal, detecting phase change in said beat signal, and differentiating said phase change over a period of time as a measure of said frequency change over said period of time.

* * * * *